US005791452A

United States Patent [19]
Reid

[11] Patent Number: 5,791,452
[45] Date of Patent: Aug. 11, 1998

[54] TRANSFER MECHANISM FOR GLASS ARTICLES

[75] Inventor: Gary G. Reid, Wallaceburg, Canada

[73] Assignee: Libbey Glass Inc., Toledo, Ohio

[21] Appl. No.: 730,071

[22] Filed: Oct. 15, 1996

[51] Int. Cl.⁶ .................................................. B65G 47/86
[52] U.S. Cl. ................................... 198/468.2; 414/753
[58] Field of Search ........................... 414/753; 901/16, 901/22; 198/468.2, 468.6

[56] References Cited

U.S. PATENT DOCUMENTS

| | | | |
|---|---|---|---|
| 4,005,782 | 2/1977 | Crockett | 901/16 X |
| 4,143,776 | 3/1979 | Meyers et al. | 198/468.2 X |
| 4,561,825 | 12/1985 | Sakata | 414/753 |
| 5,059,089 | 10/1991 | Kocaoglan | 901/22 X |
| 5,133,444 | 7/1992 | Thomason | 198/468.2 X |

*Primary Examiner*—Donald W. Underwood
*Attorney, Agent, or Firm*—Emch, Schaffer, Schaub & Porcello Co., L.P.A.

[57] ABSTRACT

A transfer mechanism for glass articles including a frame and at least two transfer units. Each of the transfer units includes a transfer device reciprocally mounted on the frame. A first hydraulic actuator device is in communication with each transfer device to move the transfer device in a substantially horizontal direction. A gripper device for gripping glass articles is in communication with each transfer device. A second hydraulic transfer device is in communication with each gripper device to move the gripper device in a substantially vertical direction. The transfer mechanism transfers glass articles directly from a mold apparatus to a conveyor apparatus.

6 Claims, 6 Drawing Sheets

5,791,452

1

TRANSFER MECHANISM FOR GLASS ARTICLES

BACKGROUND OF THE INVENTION

The present invention is directed to a transfer mechanism for glass articles. More specifically, the invention is directed to a servo-hydraulic transfer mechanism for transferring hot glass articles directly from a glass molding apparatus to a glass conveyor apparatus.

Prior art pneumatic transfer mechanisms for glass articles have many disadvantages. These mechanisms are inconsistent and unreliable in transferring hot glass articles from a molding apparatus to a conveyor apparatus. These problems have resulted in the checking or cracking of the hot glass articles during transfer. Further, the prior art mechanisms require natural gas heating in the takeout area between the molding apparatus and the conveyor apparatus. This results in high energy usage. Finally, the prior art mechanisms are large and cumbersome. This makes for difficult maintenance of the mechanisms.

In view of the foregoing, there is a need for a new transfer mechanism for hot glass articles that is accurate, reliable, energy efficient and easy to maintain. The present invention satisfies this need.

SUMMARY OF THE INVENTION

The present invention is directed to a transfer mechanism for glass articles. The mechanism includes a unitary frame and at least two transfer units movably mounted thereon. Each of the transfer units includes a transfer device reciprocally mounted on the frame. A first hydraulic actuator device, such as a hydraulic cylinder, is in communication with each transfer device to move the transfer device in a substantially horizontal direction. A gripper device, such as one having gripper fingers, is in communication with each transfer device for gripping a hot glass article during transfer. A second hydraulic actuator device, such as a hydraulic cylinder, is in communication with each gripper device to move the gripper device in a substantially vertical direction.

In a typical application, the frame is mounted between a glass molding apparatus and a conveyor apparatus. At the molding apparatus, the gripper devices grip hot glass articles and transfer them horizontally and vertically to the conveyor apparatus.

It is the primary object of the present invention to provide a transfer mechanism for glass articles that is accurate and reliable.

It is an important object of the present invention to provide a transfer mechanism for glass articles that is energy efficient.

It is another important object of the present invention to provide a transfer mechanism for glass articles that is easy to maintain.

Other objects and advantages of the present invention shall become apparent to those skilled in the art upon a review of the following detailed description of the preferred embodiments and the accompanying drawings.

2

Figure 1:
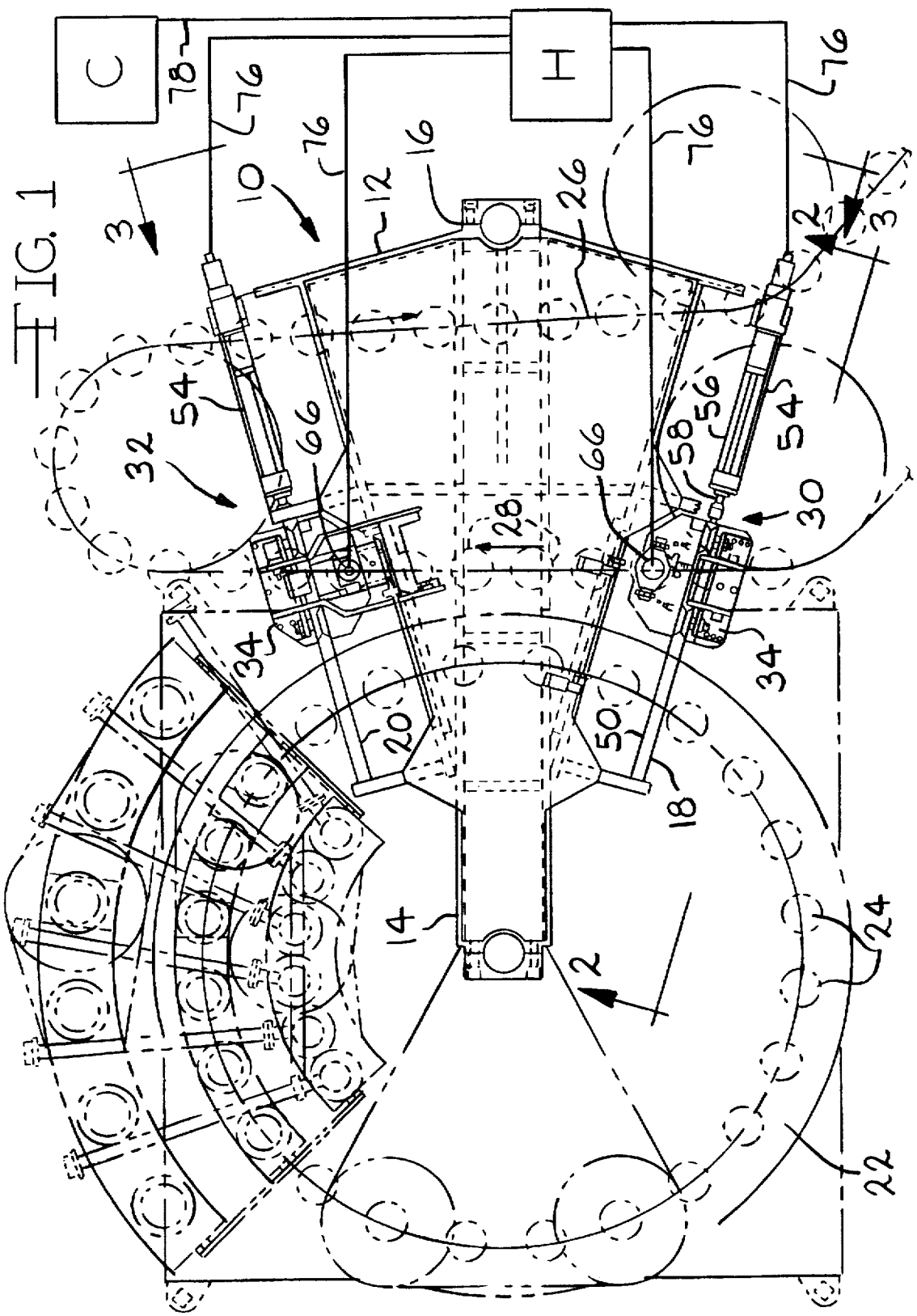
FIG. 1 is a top view of the transfer mechanism for glass articles according to the present invention positioned adjacent a glass molding apparatus and a conveyor apparatus.
Figure 3:
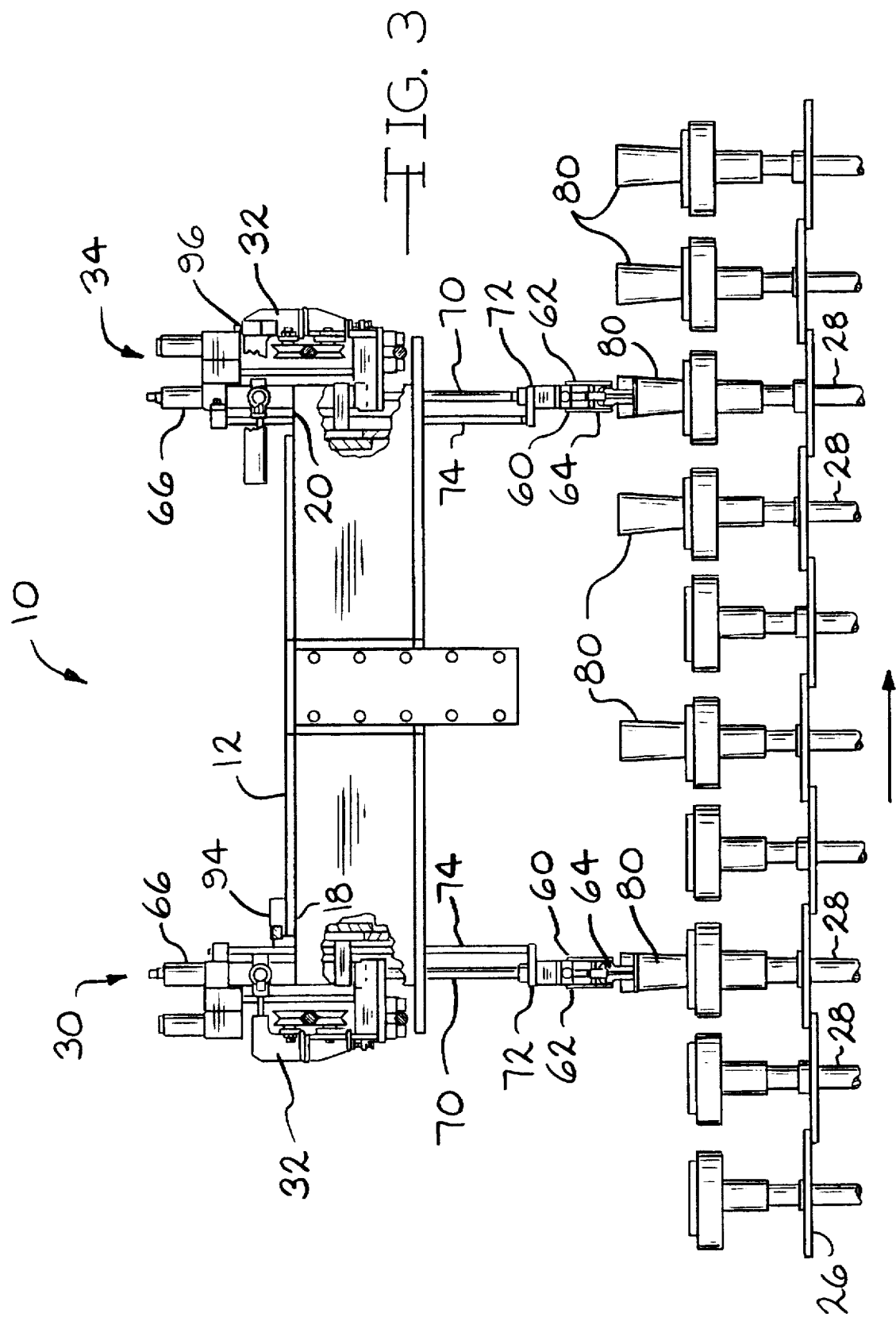
Figure 4:
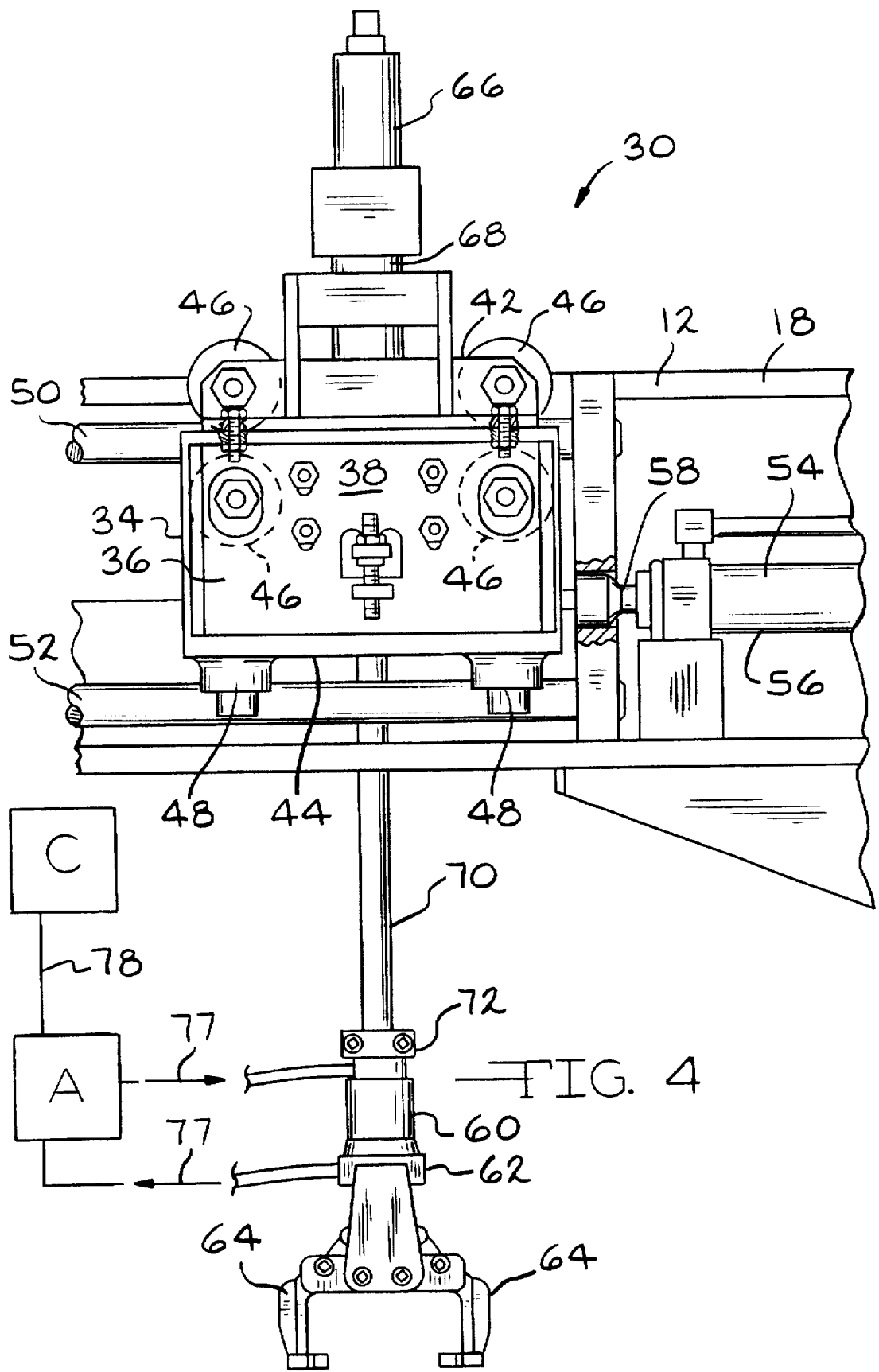
Figure 5:
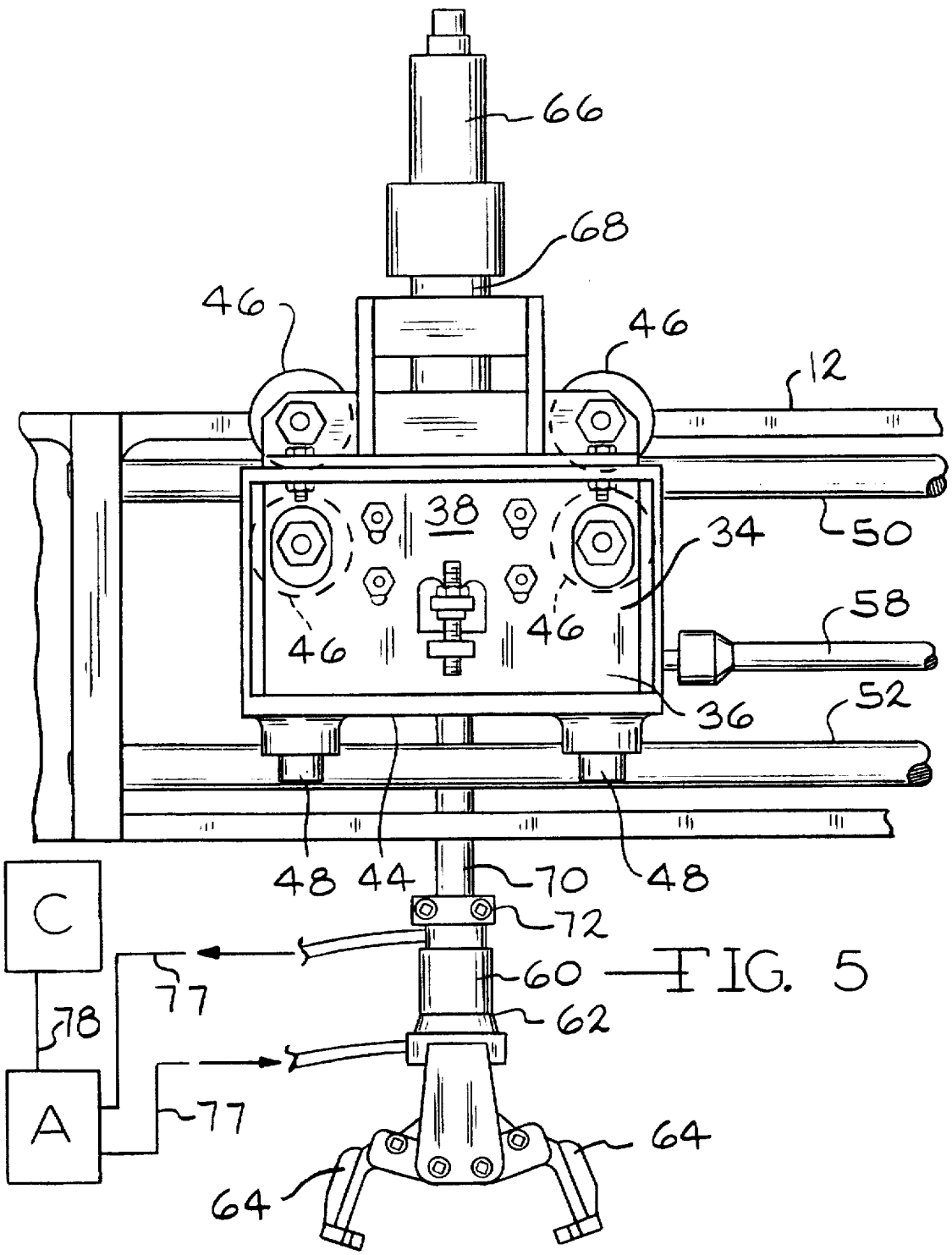

FIG. 3 is a cross-sectional view taken through line 3—3 of FIG. 1;

FIG. 4 is a side elevational view of a transfer unit according to the present invention;

FIG. 5 is a view similar to the view of FIG. 4; and

Figure 6:
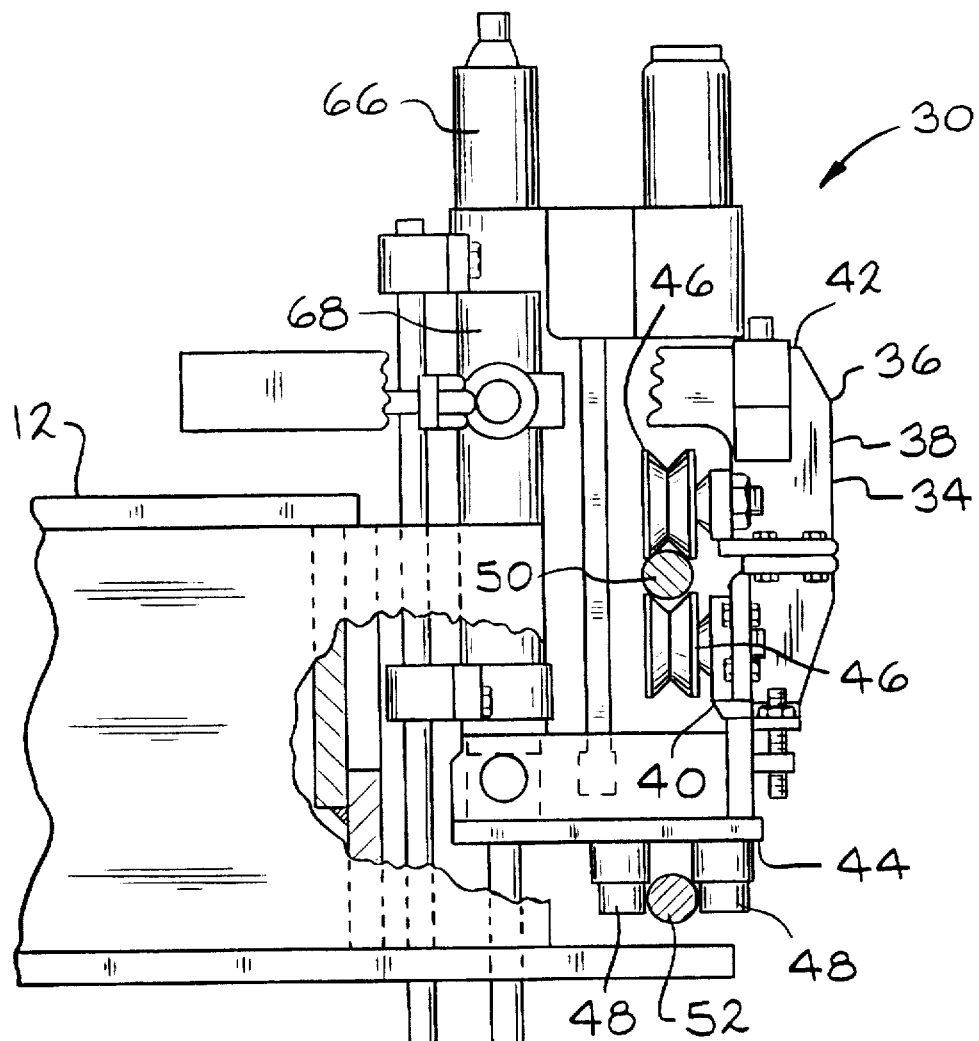

FIG. 6 is a front elevational view of a transfer unit according to the present invention.

DETAILED DESCRIPTION OF THE PREFERRED EMBODIMENTS

The preferred embodiments and best mode of the present invention will now be described in detail with reference being made to the drawings. The transfer mechanism of the present invention is indicated generally in the drawings by the reference number "10".

Referring to FIG. 1, the transfer mechanism 10 includes a unitary frame 12 having a first end 14, a second end 16, a first side 18 and a second side 20. In a typical application, the first end 14 of the frame 12 is positioned adjacent a conventional press glass molding apparatus 22 having a plurality of molds 24. The second end 16 of the frame 12 is positioned adjacent a fire polishing spindle type conveyor 26 having a plurality of spindles 28. As shown in FIG. 1, the spindles 28 have a path that proceeds under the middle of the frame 12 and continues adjacent the second end 16 of the frame 12. It should be understood that the present invention can be used in conjunction with other types of apparatus for glassware manufacture.

The transfer mechanism 10 includes a first transfer unit 30 and a second transfer unit 32 positioned adjacent the first and second sides 18 and 20, respectively, of the frame 12. While the preferred embodiment of the invention includes two transfer units, it should be understood that more than two transfer units can be included in the mechanism depending on the application.

The first and second transfer units 30 and 32 are constructed of substantially identical components. Therefore, the first transfer unit 30 will be described in detail with the description being equally applicable to the second transfer unit 32. Referring to FIGS. 4 and 6, the first transfer unit 30 includes a transfer slide assembly 34. The transfer slide assembly 34 includes a housing 36 having an outer surface 38, an inner surface 40, a top surface 42 and a bottom surface 44. At least one roller 46 is mounted on the inner surface 40 of the housing 36. In the present embodiment, there are four rollers 46. At least one guide member 48 is positioned adjacent the bottom surface 44 of the housing 36. In the present embodiment, there are two pairs of guide members 48. The frame 12 includes an upper guide rail 50 and a lower guide rail 52 on both the first side 18 and the second side 20. The rollers 46 engage the upper guide rail 50 and the guide members 48 engage the lower guide rail 52. The rollers 46 allow the transfer slide assembly 48 to reciprocate and move in a horizontal direction with respect to the frame 12. The guide members 48 help to maintain the transfer slide assembly 34 in proper alignment with the frame 12 during reciprocation and movement of the assembly.

Figure 2:
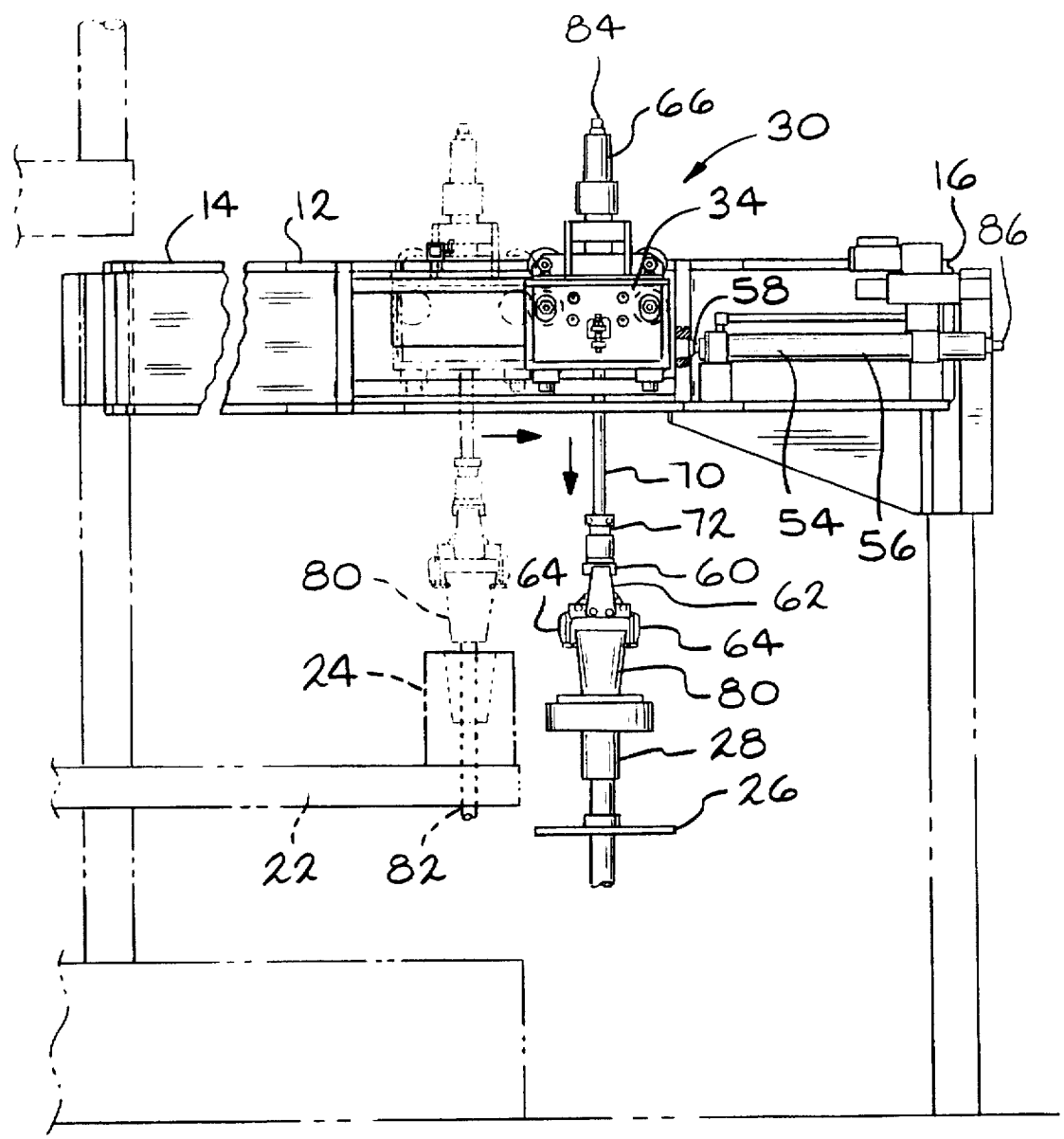
FIG. 2 is a cross-sectional view taken through line 2—2 of FIG. 1.

Referring to FIGS. 1, 2 and 4, the first transfer unit 30 includes a first hydraulic cylinder 54 that includes a cylinder housing 56 and a reciprocating rod 58. The cylinder housing 56 is fixedly attached to the frame 12. The reciprocating rod 58 is operatively connected to the housing 36 of the transfer slide assembly 34. As shown in FIG. 2, when the first hydraulic cylinder 54 is actuated, the reciprocating movement of the reciprocating rod 58 causes corresponding reciprocal and horizontal movement of the first transfer unit 30.

Referring to FIGS. 2, 4 and 6, the first transfer unit 30 of the transfer mechanism 10 includes a gripper device 60 having a gripper head 62 including at least two opposed reciprocating gripper fingers 64. It should be understood that any number of gripper fingers can be used in the invention, with two being preferred. As described below, the gripper device 60 is pneumatically actuated to allow the gripper fingers 64 to be movable between open and closed positions. As described below, the gripper device 60 grips hot glass articles from the mold apparatus 22, holds the glass article during transfer of the article from the mold apparatus to the conveyor apparatus 26 and releases the glass article on the conveyor apparatus.

Referring to FIGS. 4 and 6, the first transfer unit 30 of the transfer mechanism 10 includes a second hydraulic cylinder 66 having a cylinder housing 68 and a reciprocating shaft 70. The housing 68 of the second hydraulic cylinder 66 is fixedly attached to the transfer slide assembly 34. The reciprocating shaft 70 is operatively connected to the gripper device 60 by a coupling 72. As shown in FIG. 2, when the second hydraulic cylinder 66 is actuated, the reciprocating shaft 70 causes reciprocation and movement of the gripper device 60 in a vertical direction. Referring to FIG. 6, the first transfer unit 30 includes a vertical guide bar 74 in communication with the coupling 72 to provide for proper alignment of the gripper device 60 with respect to the first transfer unit 30 and the frame 12 during movement of the gripper device.

As schematically shown in FIG. 1, the first hydraulic cylinders 54 and the second hydraulic cylinders 66 of the first and second transfer units 30 and 32 are in communication with a hydraulic fluid source H through fluid lines 76. The hydraulic fluid source H includes a plurality of electro-mechanically controlled valves (not shown) for channeling hydraulic fluid to lines 76. As shown in FIG. 4, the gripper devices 60 of the first and second transfer units 30 and 32 are in communication with a compressed air source A through air lines 77. A programmable computer C having an operator's keyboard (not shown) is operatively connected to the hydraulic fluid source H and the compressed air source A through electrical lines 78.

Referring to FIGS. 1–6, the operation of the transfer mechanism 10 will now be described. An operator programs the computer C to send electrical signals through lines 78 to the hydraulic fluid source H and the compressed air source A. In response to such signals, the hydraulic fluid source H causes hydraulic fluid to flow through lines 76 to the first hydraulic cylinder 54 and the second hydraulic cylinder 66. The compressed air source A causes compressed air to flow through lines 77 to the gripper devices 60 of the first and second transfer unit 30 and 32. Actuation of the first hydraulic cylinders 54 causes the reciprocating rods 58 to horizontally move the transfer slide assemblies 34 from the second end 16 toward the first end 14 of the frame 12. When the transfer slide assemblies 34 are positioned adjacent the first end 14, the second hydraulic cylinder 66 are actuated to cause the reciprocating shafts 70 to raise the gripper devices 60 so that the gripper devices are positioned over the molds 24 of the mold apparatus 22. The gripper devices 60 are actuated by the compressed air source A to open as shown in FIG. 5. A hot molded glass article 80 is ejected by an ejector 82 from the mold 24 adjacent the gripper fingers 64. As shown in FIG. 2, the gripper device 60 is actuated to close the gripper fingers 64 around the glass article 80 to grip or hold the glass article. The first hydraulic cylinders 54 are again actuated by the hydraulic fluid source H to cause the reciprocating rods 58 to move the transfer slide assemblies 34 from the first end 14 toward the second end 16 of the frame 12. The second hydraulic cylinders 66 are actuated to cause the reciprocating shafts 70 to vertically move the gripper devices 60 and thus the glass articles 80 to positions adjacent the conveyor apparatus 26. Once the glass articles 80 are positioned on the spindles 28 of the conveyor apparatus 26, the compressed air source A actuates the gripper fingers 64 to open and thereby release the glass articles 80.

Referring to FIG. 3, it should be understood that the mold apparatus 22 and the conveyor apparatus 26 are in synchronized motion. The first transfer unit 30 releases a glass article 80 on every other spindle 28 of the conveyor apparatus 26. The second transfer unit 32 does the same to provide the conveyor apparatus 26 with a full complement of glass articles 80.

The first and second hydraulic cylinders 54 and 66 include conventional linear positional transducers 84 and 86 as shown in FIG. 2. The positional transducers 84 and 86 monitor the movement of the transfer units 30 and 32 by sending signals to the programmable computer C. These signals are interpreted by the computer and appropriate signals are sent to the hydraulic fluid source H to provide for the proper actuation of the various components of the transfer units.

As shown in FIG. 3, the first and second transfer units 30 and 32 further include conventional limit switches 94 and 96. These limit switches monitor the movement of the transfer units 30 and 32. If the transfer units travel outside of their predetermined fields of movement, the limit switches are actuated thereby causing the transfer mechanism 10 to cease operation.

As it will be appreciated, the present invention provides many advantages over prior art apparatus. First, the servo-hydraulic apparatus of the present invention provides for the consistent and reliable transfer of glass articles from a mold apparatus to a conveyor apparatus. Second, the invention is energy efficient due to the elimination of heating in the takeout area. Finally, the apparatus of the invention is simple thereby allowing for quick and easy maintenance.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. A servo-hydraulic transfer mechanism for glass articles, comprising in combination:

a frame having a first end, a second end, a first side and a second side, each of said first and second sides including at least one guide rail;

a hydraulic fluid source;

a programmable computer;

a compressed air source; and a first transfer unit and a second transfer unit, each of said transfer units including:

a transfer slide assembly reciprocally mounted on said at least one guide rail on one of said first and second sides by roller means for providing rolling engagement between said transfer slide assembly and said at least one guide rail on one of said first and second sides;

a first hydraulic cylinder operatively connected to said transfer slide assembly and said hydraulic fluid source to move said transfer slide assembly in a substantially horizontal direction between said first and second ends of said frame;

a first linear positional transducer operatively connected to said first hydraulic cylinder and said programmable computer to monitor movement of said transfer slide assembly;

a gripper device for gripping glass articles operatively connected to said transfer slide assembly, said gripper device having a gripper head including at least two opposed reciprocating gripper fingers, said gripper device being operatively connected to said compressed air source to move said fingers between open and closed positions, said compressed air source being operatively connected to said programmable computer to control movement of said fingers;

a second hydraulic cylinder operatively connected to said gripper device and said hydraulic fluid source to move said gripper device in a substantially vertical direction; and a second linear positional transducer operatively connected to said second hydraulic cylinder and said programmable computer to monitor movement of said gripper device.

2. The servo-hydraulic transfer mechanism of claim 1, wherein each of said first and second sides of said frame includes an upper guide rail and a lower guide rail.

3. The servo-hydraulic transfer mechanism of claim 2, wherein said roller means of each said transfer unit consists of at least one roller engaged with one of said upper guide rails.

4. The hydraulic transfer mechanism of claim 1, wherein said first end of said frame is positionable adjacent a glass molding apparatus and said second end of said frame is positionable adjacent a glass conveyor apparatus.

5. The servo-hydraulic transfer mechanism of claim 3, wherein said roller means includes four rollers.

6. The servo-hydraulic transfer mechanism of claim 1, wherein each of said first and second transfer units includes at least one limit switch to monitor movement of said transfer units.

* * * * *